Feb. 22, 1955  T. R. MERTON  2,702,393
DEVICE FOR CUTTING VERY FINE PITCH HELICES
FOR PRODUCING DIFFRACTION GRATINGS
Filed Nov. 29, 1950  2 Sheets-Sheet 2

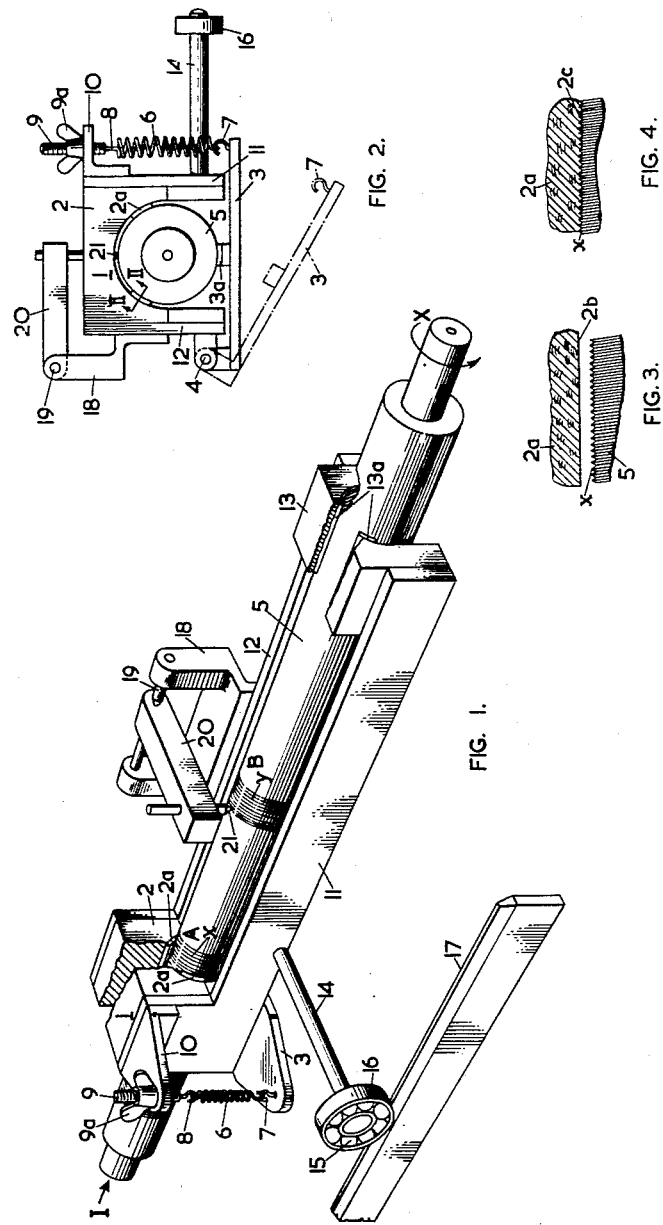

Inventor
SIR THOMAS RALPH MERTON,
By
Robert B Larson
Attorney

United States Patent Office 2,702,393
Patented Feb. 22, 1955

2,702,393

DEVICE FOR CUTTING VERY FINE PITCH HELICES FOR PRODUCING DIFFRACTION GRATINGS

Thomas Ralph Merton, Maidenhead Thicket, England, assignor to National Research Development Corporation, London, England, a British corporation Application November 29, 1950, Serial No. 198,078

Claims priority, application Great Britain December 6, 1949

14 Claims. (Cl. 10—101)

This invention relates to a mechanism for use in the transmission of motion and involving as a component thereof a nut-forming means adapted to co-operate with a relatively rotatable male screw. The mechanism is particularly, though not exclusively, applicable for use in the cutting or ruling of screws, helices, scales or diffraction gratings.

It is well known that screws, helices, scales and diffraction gratings which have been cut or ruled on a lathe or dividing engine are found to exhibit inaccuracies and especially periodic errors which are due to imperfections in the lathe or dividing engine which is used in their construction.

In the construction of lathes, dividing engines, and many other machine tools, it is usual to effect the slow motion of a tool or carriage by attaching such tool or carriage to a nut which is fitted to a screw, the motion being brought about by the rotation of the screw whilst the nut is prevented from rotating. From the foregoing considerations it is to be recognised that in forming a screw thread by lathe or like operation where gearing and a primary lead-screw are employed, periodic errors in the formed screw thread are liable to occur as a result of eccentricity of the gear wheels in the gearing, or malformation of teeth in the gear train, whilst other inaccuracies may arise due to some degree of longitudinal play of the lead-screw in an end-thrust bearing therefor.

If a screw and a nut were both perfect the screw should turn freely in the nut, even in the case in which the threads of the nut fitted the screw at every point to a degree not far short of absolute contact. Since screws and nuts are never perfect it is evident that a screw can in general turn in a nut because it fits it loosely; and the better the screw and nut the closer can be the fit.

Now, it is an object of the present invention to minimise the irregularities of motion that are liable to occur in motion transmitting mechanisms where the motion results from relative rotation taking place between components which consist, in effect, of a nut and a screw with which the nut co-operates.

Accordingly the invention is concerned with a motion transmitting mechanism including a nut-forming component adapted to engage with the thread of a male screw component and arranged so that as relative rotation occurs between the said components an axial motion is imparted to one component by the other, the invention consisting primarily in that the thread portion of the nut-forming component is formed of an elastic material the elasticity of which is sufficient to ensure that whilst relative rotation of the said components can take place with comparative freedom an intimate contact is maintained between the interengaging threads of the components during such rotation. When the elastic thread pertaining to the nut-forming component is thus in engagement with a plurality of turns of the male screw thread and the relative rotation occurs, such imperfections as periodic errors in the original formation of the male screw thread are averaged out owing to the elasticity of the elastic thread and irregularities in the resulting axial motion due to such errors are minimised.

To obtain substantially complete correction of the axial motion caused by a periodic error of the male screw thread the elastic thread of the nut-forming component should be in engagement with such a plurality of turns of the male screw thread as to extend axially over a range of at least one complete cycle of the periodic error.

The elastic thread of the nut-forming component as applied to a fine screw having many threads to the inch, for example of the order of five hundred threads to the inch or more may be formed by the action of maintaining an elastic resilient material in pressed relation against the thread of the male screw component.

An improved mechanism embodying the present invention may thus comprise a nut-forming component having jaws adapted to be clamped over a threaded portion of a rod or cylinder, the jaws having inserts of cork, rubber, fibre, leather, balsa wood or other deformable substance.

Conveniently, the mechanism may be arranged so that the nut-forming component provides a mounting for a tool holder, so that if the rod or cylinder aforesaid is threaded over that part of its length over which the nut-forming component is fitted, a cutting tool or stylus, which may be a diamond, carried by the tool holder can be caused to form a corrected thread on another part of the rod or cylinder, the errors due to periodic and other movements of the rod or cylinder as a whole being substantially eliminated. Where the cylinder or rod is made of metal, the tool holder and the nut-forming component (apart from the elastic thread thereof) may be made of the same metal as the cylinder or rod, so that the errors due to expansion owing to a change in temperature can be substantially eliminated.

The invention will now be described with reference to the accompanying drawings wherein:

Figure 1 is a perspective view showing, by way of example, a convenient manner of embodying the invention in a motion transmitting mechanism adapted for ruling or cutting a helix on a cylinder;

Figure 2 is an end view of the mechanism, taken in the direction of the straight arrow I shown in Figure 1;

Figures 3 and 4 are fragmentary enlarged sectional comparative views taken at the line II—II of Figure 2 and illustrating different screw thread relationships according to whether a clamping pressure is not, or is applied;

Figure 5:
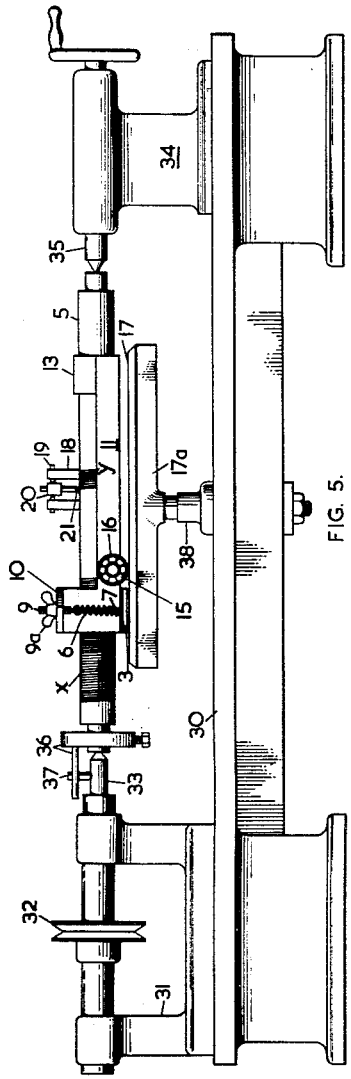
Figure 5 shows in front elevation a lathe with the mechanism mounted thereon.

Referring firstly to Figures 1 and 2, a nut-forming component denoted generally by the numeral 1 comprises an upper metal jaw member 2 and a lower metal jaw member 3, the jaw member 2 being saddle shaped as shown and the jaw member 3 being of a flat plate construction which is pivotally connected to the upper jaw member 2 by means of a hinge 4. Spaced apart at substantially 120° on the underside of the arch that is formed by the saddle shaped jaw member 2 there are adhesively secured, as by means of ordinary sealing wax, a pair of thin strip-like inserts 2a consisting of cork. A similar cork insert 3a is secured to a projecting part 3b on the upper surface of the lower jaw member 3 at a position such that when the jaw member 3 occupies the position shown in full lines in Figure 2 the insert 3a is disposed at 120° with respect to each of the inserts 2a. The jaw members 2 and 3 are adapted to be clamped over a screw-threaded portion A of a cylindrical metal mandrel 5 in such a way as to cause the inner exposed surfaces of the inserts 2a and 3a to engage with a plurality of the threads x of the threaded portion A. In applying the jaw members 2 and 3 to the mandrel 5 the lower member 3 can be swung about the hinge 4 so that it is free to assume a position as suggested in dotted outline in Figure 2 whereby after the jaw member 2 has been placed in position over the mandrel 5 the jaw member 3 is raised so as to cause the insert 3a to bear against the underside of the mandrel 5. The jaw member 3 is held in the raised position by means of a tensioning spring 6 the lower end of which engages with a hook 7 on the jaw member 3, whilst the upper end of the spring 6 is anchored to a hook 8 carried by a screw 9 which passes through a lug 10 on the jaw member 2. By appropriate rotation of a wing nut 9a which is mounted on the screw 9 and is adapted to bear against the upper side of the lug 10, the screw 9 can be raised or lowered so as to regulate, through the tension of the spring 6, the clamping pressure exerted by the jaw members 2 and 3.

In the arrangement illustrated, the pitch of the screw threads x at the threaded portion A is assumed to be very small, say of the order of 500 threads to the inch or more, these threads having been formed initially by a conventional helix ruling operation with the aid of a diamond or stylus. Prior to the application of clamping pressure, the surface of the cork inserts 2a and 3a, which are all of the same character, is substantially smooth as indicated at 2b of the enlarged sectional view of an insert 2a according to Figure 3. In this figure a clearance is represented between the surface at 2b and the screw threads x pertaining to the mandrel 5. On the other hand, as indicated in Figure 4, when the clamping pressure is applied the surface of the insert 2a becomes impressed by and conforms to the threads x of the mandrel 5 as indicated at 2c. So long as the condition represented by Figure 4 obtains, the thread portions 2c of the cork insert 2a shown (and likewise similar thread portions of the other insert 2a and also of the insert 3a) provide an elastic thread maintained in intimate contact with the screw threads x of the mandrel 5.

The jaw member 2 forms part of a frame structure composed of spaced apart longitudinal frame members 11, 12 which at an end remote from the jaw member itself are bridged by a saddle piece 13 which is arched so as to fit over a further part of the mandrel 5. The saddle piece 13 which carries on its underside a pair of pad members 13a of smooth anti-friction material consisting, for example, of strips of polytetraflorethylene, serves, when in the position illustrated, to maintain alignment of the nut-forming component 1 as a whole, without affecting any axial movement thereof.

The nut-forming component 1, in addition to comprising a unitary assembly of the jaw members 2 and 3, the frame members 11, 12 and the saddle piece 13, carries an outrigger attachment consisting of an arm 14 extending laterally from the frame member 11, the outer end of the arm 14 being provided with a bearing 15 supporting a wheel 16 adapted to bear against a flat surfaced stationary track 17, so that the component 1 can be restrained from rotation whilst being capable of moving axially, i. e. longitudinally with respect to the mandrel 5.

Rigidly attached to the frame member 12 is an upstanding bifurcated bracket 18 in which is pivotally mounted at 19 one end of a tool holding arm 20, the other end of the arm 20 having a cutting tool 21, such as a stylus or diamond type cutter, mounted therein so as to bear against the mandrel 5.

Figure 6:
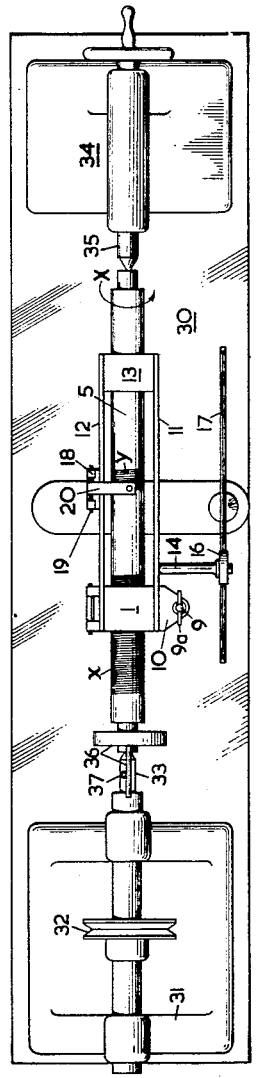
Figure 6 is a plan of the lathe and mechanism shown in Figure 5.

Referring now also to Figures 5 and 6, the mandrel 5 is arranged to be mounted on and driven by a lathe comprising a bedplate 30, a headstock 31 carrying a driving pulley 32 for a live centre 33, and a tailstock 34 supporting a dead centre 35. The mandrel 5 is mounted between the centres 33 and 35 and fitted with a carrier 36 adapted to be engaged by a catchpin 37 on the live centre 33 so as to take up a rotational drive from the pulley 32. The nut-forming component 1 is applied to the mandrel 5 in the manner previously referred to, the wheel 16 of the outrigger arm bearing against the longitudinally extending track 17 provided by the upper surface of a member 17a mounted in a toolpost 38 of the lathe. The member 17a is set such that the track 17 extends parallel to the mandrel 5.

With the nut-forming component 1 mounted in the operative position on the mandrel 5 as shown in Figures 1, 5 and 6, that is to say, with the jaw members 2 and 3 tensioned by the spring 6 sufficiently to cause the inserts 2a and 3a to develop the thread formation (as indicated at 2c in Figure 4) intimately in contact with the screw threads x, the component 1 is in a condition to function as an axially movable follower in response to rotation of the mandrel 5. Thus when the pulley 32 of the lathe is driven so as to rotate the mandrel, and therewith the threads x, in the sense indicated by the arrow X, the threads x, acting as a lead-screw, impart to the unit-forming component 1 a longitudinal movement towards the left as viewed in Figures 1, 5 and 6. Thereupon the tool 21 is caused to inscribe or cut threads y at the region B of the mandrel 5. The threads x therefore constitute a primary screw from which in turn the nut-forming component 1 causes the production of a secondary helix composed of the threads y. These threads y, however, form a corrected reproduction of the threads x owing to the elasticity of the thread portions (as at 2c of Figure 4) of the inserts 2a and 3a pertaining to the nut-forming component 1.

As has been mentioned hereinbefore, the pitch of the screw thread which may be handled by mechanism according to the invention may be either coarse or fine. In the apparatus as illustrated in the drawings it may be assumed that the primary threads x constitute a fine screw of the order of five hundred threads to the inch or more. In the initial formation of the threads x the cycle of a periodic error might repeat itself every one-fifteenth of an inch. Hence, in such a case, the elastic thread portions 2c of the nut-forming component 1 should extend over at least one-fifteenth of an inch, though in practice the elastic thread portions 2c are desirably sufficient to extend over a multiple of periods. For example, where the cycle of periodic error repeats itself every one-fifteenth of an inch, the thread portions 2c may extend over a length amounting to at least one inch.

The mechanism according to the invention is applicable also to the case where, instead of forming the primary threads x by means of a single-pointed tool, use is made of a tool comprising a pad of abrasive material for producing thread formations of an irregular character, such thread formations constituting a male screw to which the nut-forming component 1 can be applied in the same manner as above referred to in connection with the threads x.

I claim:

1. A motion transmitting mechanism including a male screw component comprising a single cylindrical mandrel having a fine thread formed over a portion of its surface, and means for rotating said mandrel about the axis thereof, a nut-forming component fitted over said fine thread and having means for restraining said nut-forming component from rotation and permitting said component to move axially as a screw follower in response to rotation of said mandrel, said nut-forming component including an elastic resilient material and means for maintaining said material in pressed relation against said fine thread on said mandrel so as to form at the contacting surface of said material a fine elastic thread in intimate contact with said thread on the mandrel, an inscribing tool carried by said nut-forming component for participating in axial movement of said component, said tool being adapted to bear in inscribing relation upon a part of said single mandrel remote from said fine thread thereon, whereby upon rotation of said mandrel the fine thread thereon imparts to said nut-forming component an axial movement to cause said inscribing tool to inscribe a fine helix formation derived from said fine thread on the mandrel, such imperfections as periodic errors in the original formation of said fine thread on the mandrel being averaged out owing to the elasticity of said elastic thread.

2. A motion transmitting mechanism as set forth in claim 1, said nut-forming component comprising a frame structure extending longitudinally of part of said single mandrel, and said frame structure including a guide saddle for engaging a part of said single mandrel to maintain alignment of said nut-forming component without affecting the axial movement thereof.

3. A motion transmitting mechanism as set forth in claim 1, said nut-forming component comprising a frame structure extending longitudinally of part of said single mandrel, said frame structure including a guide saddle for engaging a part of said mandrel to maintain alignment of said nut-forming component without affecting the axial movement thereof, and pad means carried by said saddle for engaging the surface of the mandrel, said pad means consisting of a smooth anti-friction material.

4. Motion transmitting mechanism comprising a nut-forming component, an inscribing tool operatively connected to said nut-forming component, a screw component having thereon a male thread portion possessing at least one complete cycle of a periodic error, said nut-forming component including a deformable portion for engagement with said male thread of the screw component so that through interengagement of said male thread portion and said deformable portion as relative rotation occurs between said nut-forming component and said screw component an axial motion is imparted to one of said components by the other, said deformable portion of the nut-forming component being formed of an elastic resilient material deformable to constitute an elastic thread having an elasticity sufficient to ensure that while relative rotation of said components can take place with comparative freedom an intimate contact and interengagement is maintained between said male thread portion and said elastic thread, the elastic thread of the nut-forming component making engagement with such a plurality of turns of said male thread of the screw component as to extend over a range of at least one complete cycle of a periodic error of said male thread, whereby during said relative rotation the imperfections in the form of periodic errors in the original formation of said male thread are averaged out owing to the elasticity of said elastic thread and irregularities in the resulting axial motion due to said errors are minimized.

5. Motion transmitting mechanism comprising a nut-forming component, an inscribing tool operatively connected to said nut-forming component, a screw component having thereon a male thread portion possessing at least one complete cycle of a periodic error, said nut-forming component providing thereon a deformable portion for making thread-like engagement with said male thread of the screw component so that through said thread-like engagement as relative rotation occurs between said nut-forming component and said screw component an axial motion is imparted to one of said components by the other, said nut-forming component including as said deformable portion an elastic resilient material, means for maintaining said material in pressed relation against said male thread of the screw component so as to form at its contacting surface the thread-like engagement with said male thread, said material extending over a range of at least one complete cycle of a periodic error of said male thread.

6. Motion transmitting mechanism as set forth in claim 5, said nut-forming component comprising at least two relatively movable jaw members each carrying thereon at least one portion of said elastic resilient material, and means enabling said jaw members to clamp said portions of elastic resilient material in the pressed relation against said male thread of the screw component.

7. Motion transmitting mechanism as set forth in claim 5, said nut-forming component comprising at least two relatively movable jaw members each carrying thereon at least one portion of said elastic resilient material, and means enabling said jaw members to clamp said portions of elastic resilient material in the pressed relation against said male thread of the screw component, said portions of elastic resilient material being in spaced apart relation to engage with said male thread of the screw component only at spaced regions around said male thread.

8. Motion transmitting mechanism as set forth in claim 5, said elastic resilient material being composed of cork.

9. Motion transmitting mechanism as set forth in claim 5, said elastic resilient material being composed of rubber.

10. Motion transmitting mechanism as set forth in claim 5, said elastic resilient material being composed of fiber.

11. Motion transmitting mechanism as set forth in claim 5, said elastic resilient material being composed of leather.

12. Motion transmitting mechanism as set forth in claim 5, said elastic resilient material being composed of balsa wood.

13. Motion transmitting mechanism as set forth in claim 5, having the pitch of the male thread of the screw component of the order of five hundred or more threads to the inch.

14. A nut-forming component for use as an axially movable follower in response to rotation of a single screw component having a male thread for engagement with a co-operating thread forming portion of the nut-forming component, said nut-forming component having a thread-forming portion thereof formed of an elastic resilient material deformable under pressure action of its surface against said male thread to constitute an elastic thread, said elastic thread having an elasticity sufficient to ensure that while relative rotation of said components can take place with comparative freedom an intimate contact is maintained between said elastic thread and said male thread, and means for supporting and conveying with the axial movement of the nut-forming component a tool for inscribing upon an unthreaded part of said single screw component a helix formation derived from the axial movement imparted to said nut-forming component.

References Cited in the file of this patent

UNITED STATES PATENTS

| | | |
|---|---|---|
| 220X | Wilkinson | Dec. 14, 1798 |
| 228,816 | Huff | June 15, 1880 |
| 240,892 | Courtenay | May 3, 1881 |
| 1,344,607 | Samotej | June 22, 1920 |
| 1,879,061 | Brosse | Sept. 27, 1932 |
| 1,945,586 | Arni | Feb. 6, 1934 |
| 2,297,437 | Stapelfeldt | Sept. 29, 1942 |

FOREIGN PATENTS

| | | |
|---|---|---|
| 37,657 | Denmark | July 4, 1927 |
| 708,130 | France | Apr. 27, 1931 |